United States Patent
Hamm (10) Patent No.: US 8,909,371 B2
(45) Date of Patent: Dec. 9, 2014

(54) SPECIFYING A PERMITTED MOVEMENT RANGE WITH A POINTER

(71) Applicant: Carsten Hamm, Erlangen (DE)

(72) Inventor: Carsten Hamm, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 142 days.

(21) Appl. No.: 13/678,094

(22) Filed: Nov. 15, 2012

(65) Prior Publication Data

US 2013/0120253 A1 May 16, 2013

(30) Foreign Application Priority Data

Nov. 16, 2011 (EP) .................................... 11189290

(51) Int. Cl.
*G06F 19/00* (2011.01)
*G05B 19/4061* (2006.01)
*G06F 3/033* (2013.01)
*B25J 9/16* (2006.01)

(52) U.S. Cl.
CPC ............ *G06F 3/033* (2013.01); *G05B 19/4061* (2013.01); *B25J 9/1676* (2013.01)
USPC ............... 700/245; 701/50; 400/50; 400/279; 400/320; 400/342; 400/708

(58) Field of Classification Search
CPC ... B25J 9/1676; G05B 17/02; G05B 19/4061; G05B 19/41865; G05B 19/41875
USPC ............... 700/245; 701/50; 400/50, 279, 320, 400/342, 708
See application file for complete search history.

(56) References Cited

U.S. PATENT DOCUMENTS

| | | | | |
|---|---|---|---|---|
| 4,977,529 A | * | 12/1990 | Gregg et al. | 703/18 |
| 7,440,932 B2 | * | 10/2008 | Gartland et al. | 706/46 |
| 7,912,568 B2 | * | 3/2011 | Bagwell et al. | 700/103 |
| 8,000,656 B1 | * | 8/2011 | Jiao et al. | 455/67.11 |
| 8,594,977 B2 | * | 11/2013 | Laberge et al. | 702/184 |
| 2009/0143912 A1 | | 6/2009 | Lin | |

FOREIGN PATENT DOCUMENTS

| | | |
|---|---|---|
| DE | 3406212 A1 | 8/1985 |
| DE | 29707922 U1 | 11/1997 |
| GB | 2285550 A | 7/1995 |

OTHER PUBLICATIONS

J.P. Sondermann, P.Nimz: Neue Wege in der Koordinatenmeβtechnik; Mobile 3D-Meβsysteme im industrielien Umfeld; in ZWF CIM Zeitschrift für Wirtschafüiche Fertigung und Automatisierung 85, Nr. 4,(1990) München; Others; 1990; (2012 Q 07917).

* cited by examiner

*Primary Examiner* — McDieunel Marc
(74) *Attorney, Agent, or Firm* — Henry M Feiereisen LLC (57) ABSTRACT

A pointer is guided by a user of a processing machine in succession to a number of locations of a working space of the processing machine. The pointer has first location determining devices which are arranged at predetermined pointer locations relative to a pointer coordinate system in fixed relationship to the pointer. Through interaction of the first location determining devices with second location determining devices arranged at predetermined locations relative to a machine coordinate system in fixed relationship to the processing machine, data describing a geometric relationship of the location determining devices relative to one another are acquired. These data are transmitted to a control device which determines the position of the pointer in the working space based on the characteristic data and based on the data subdivides the working space into a permitted movement range for a component of the processing machine and a complementary prohibited movement range.

17 Claims, 7 Drawing Sheets

SPECIFYING A PERMITTED MOVEMENT RANGE WITH A POINTER

CROSS-REFERENCES TO RELATED APPLICATIONS

This application claims the priority of European Patent Application, Serial No. EP 11189290, filed Nov. 16, 2011, pursuant to 35 U.S.C. 119(a)-(d), the content of which is incorporated herein by reference in its entirety as if fully set forth herein.

BACKGROUND OF THE INVENTION

The present invention relates to an operating method for a processing machine and to a computer program having machine code which can be processed directly by a control device of a processing machine.

The following discussion of related art is provided to assist the reader in understanding the advantages of the invention, and is not to be construed as an admission that this related art is prior art to this invention.

Processing machines such as numerically controlled machine tools, for example, are used for the automated production of workpieces. The working space which can be reached in principle by the kinematics of the respective machine (essentially the movement range of the axes) is usually restricted due to necessary structural machine components such as, for example, covers, clamping means, etc. The restriction of the freedom of movement must be made known in a suitable form to the control device of the processing machine in order to avoid possible process disruptions such as for example a collision of the tool spindle with a clamping device.

Various methods to protect against collisions are known and in use.

Methods acting mechanically or based on sensors, while easy to realize, have the disadvantage that they do not respond until a collision has occurred. With controller-based solutions, in contrast, it is possible to detect an imminent collision in advance and to prevent the collision.

In mass production scenarios and where there is a high level of automation it is worthwhile, as part of the work preparations, to produce a complete geometric model of the processing machine and to simulate the processing. However, in smaller batch production runs or where the machinery is more frequently retooled by hand this is a purely manual operation. The mounting situation and the other areas exposed to a risk of collision must be checked by the user of the processing machine and parameterized in the controller. This can be accomplished for example by entering coordinates for software limit switches in a table.

Partially automated methods are also known in which the working space is measured by means of optical sensors and mapped into a data model. Laser scanners and/or image recognition systems for example are used for methods of said kind. A disadvantageous aspect of this approach are the high costs for lasers, camera, etc., as well as the extremely computationally intensive and in many cases unreliable evaluation of the optically acquired data.

It would therefore be desirable and advantageous to obviate prior art shortcomings and to provide an improved, simple and intuitive way to subdivide the movement range into a permitted and a prohibited movement range

SUMMARY OF THE INVENTION

According to one aspect of the present invention, a method for operating a processing machine, wherein the processing machine has in a normal mode of operation a permitted movement range for movement of a movable component and a prohibited movement range for the movable component under control of a control device, with the permitted movement range and the prohibited movement range being complementary to one another and together forming a working space within which the movable component can move, includes—in a command mode—moving a pointer under guidance from a user in succession to a plurality of locations in the working space, said pointer having a plurality of first location determining devices arranged at predetermined pointer locations relative to a pointer coordinate system fixed in relation to the pointer, acquiring data characteristic at least of a geometric relationship of the first location determining devices relative to a plurality of second location determining devices arranged at predetermined machine locations relative to a machine coordinate system fixed in relation to the processing machine through interaction of the first location determining devices with the second location determining devices, determining a position of the pointer in the working space based on the acquired characteristic data, the predetermined pointer locations and the predetermined machine locations, and subdividing the working space of the processing machine into the permitted movement range and the prohibited movement range based on the determined position of the pointer.

The operations in command mode may be carried out by a control device of the processing machine.

The present invention accordingly addresses in particular the central problem of how the corresponding positions based on which the control device performs the subdivision of the movement range can be made known to the control device.

A pointer, within the context of the present invention, is not a data processing construct by means of which reference is made to a specific data element in a memory of a data processing device. Rather, a pointer, within the meaning of the present invention, is a mechanical element which is moved geometrically from location to location by the user. For example, it can be a stylus which a corresponding pointer tip.

According to another advantageous feature of the present invention, the number of first and second location determining devices may be selected according to requirements. For example, only a single first location determining device may be present. However, this approach may require a plurality of second location determining devices to be present in order to be able to determine the position of the pointer in the working space based on the geometric relationships. For example, four or more second location determining devices may be present. If, on the other hand, the number of first location determining devices is increased, for example to two, three or four, the number of second location determining devices can conversely be reduced or else the additionally available information can be used for determining also the orientation of the pointer in the working space. Irrespective of the number of first location determining devices, however, a plurality of second location determining devices should preferably be present as a rule, for example two or three second location determining devices.

Insofar as reference is not explicitly made hereinafter to the fact that a plurality of first and/or a plurality of second location determining devices are present, the use of the plural serves merely to explain the circumstances contingent on the respective number of location determining devices, not to fixedly specify a plurality of first and/or second location determining devices. This applies analogously to the transmitters, receivers, reflectors and transponders which are still to be introduced later.

The evaluation of the acquired geometric relationships proves particularly simple when the characteristic data is in each case characteristic of the distances of the first location determining devices from the second location determining devices.

Advantageously, each of the first or the second location determining devices may emit a signal, with the respective other location determining devices receiving the emitted signals, and the respective other location determining devices transmitting the characteristic data to the control device.

According to another advantageous feature of the present invention, each of the first or the second location determining devices may emit a signal, the respective other location determining devices may reflect the emitted signals or re-emit them in modified form, the first or the second location determining devices may receive the reflected signals or the signals re-emitted in modified form and transmit the characteristic data to the control device. The first location determining devices mat then advantageously be embodied in combined form as transceivers which are connected by way of a data communications link to the control device for the purpose of transmitting the characteristic data. In this case the second location determining devices may be embodied as reflectors or as transponders. Alternatively, in a reverse embodiment, the second location determining devices may be embodied as combined transceivers and the first location determining devices as reflectors or as transponders.

A transceiver is a device which—as its name implies—comprises both transmitter functionality and receiver functionality. Reflectors are devices which reflect a transmit signal without further modification. Transponders are devices which emit a modified signal based on the received signal. The modification can consist in a frequency conversion and/or in a modulation of the corresponding signal. For example, the signal re-emitted by a transponder can be modulated by means of a transponder-specific identifier.

Within the context of the invention, the term transmitter may hereinafter refer not only to a transmitter per se, but also to a transceiver. Likewise, the term receiver may hereinafter refer not only to a receiver per se, but also a transceiver.

According to another advantageous feature of the present invention, the evaluation of the characteristic data proves particularly easy when at least the receivers provide the signals received by them with a timestamp, in other words register the receive times. When, for example, transmitter and receiver are separate devices and the transmitters provide signals emitted by them with a timestamp that is characteristic of the transmit time, the propagation delay is known directly based on the respective transmit time and of the respective receive time, so that in conjunction with the known propagation velocity of the sent signal the distance of the respective first from the respective second location determining device is known. When, on the other hand, only the receivers provide the signals received by them with a timestamp, the receive times must be corrected with an offset (=transmit time). The offset can be determined if a sufficient number of receive times are known for the respective transmit time.

As already mentioned, it is possible for a plurality of transmitters may be present. In this case, the transmit signals may advantageously include a respective transmitter identifier individualizing the respective transmitter and/or that the transmitters may emit their transmit signals simultaneously on different frequencies or using time division multiplexing.

According to another advantageous feature of the present invention, the characteristic data may be transmitted wirelessly by the receivers to the control device.

Advantageously, the signals emitted by the transmitters may be acoustic signals, for example ultrasound signals, because the geometric relationships can be determined with a high degree of accuracy and with considerably less effort due to the relatively low propagation velocity of acoustic signals compared to electromagnetic waves.

According to another advantageous feature of the present invention, in addition to determining the position of the pointer in the working space, the control device may also determine the orientation of the pointer in the working space based on the transmitted characteristic data, the predetermined pointer locations and the predetermined machine locations. In this case, several first and second location determining devices may be required compared to a situation where only the position of the pointer is determined.

According to another advantageous feature of the present invention, the pointer may have a handle section and a trigger element arranged in the handle section, wherein the actuation of the trigger element by the user initiates the acquisition of the characteristic data and/or the transmission of the characteristic data to the control device and/or the determination of the position of the pointer in the working space. For example, actuating the trigger element may initiate the operation of the first location determining devices such that the first location determining devices act only in this state as transmitters and/or as receivers or—in the case of the embodiment as transponder—only in this case emit the corresponding modulated signal. Advantageously, the actuation of the trigger element may be communicated—in a wired or wireless manner—to the second location determining devices and there triggers the corresponding response. Advantageously, only the actuation of the trigger element may initiate the transmission of the characteristic data to the control device. Advantageously, the actuation of the trigger element may be communicated—in a wired or wireless manner—directly to the control device and there triggers the acceptance of the characteristic data and/or the determination of the position of the pointer.

According to another advantageous feature of the present invention, determined positions of the pointer may be selected by the user, a grouping command may be specified to the control device by the user, the control device may combine the selected positions of the pointer into a respective position group based on the grouping command, and the control device may subdivide the working space into the permitted and the prohibited movement range using the respective position group.

According to another advantageous feature of the present invention, based on the respective position group, the control device may determine a valid object contour and the control device may classify the determined valid object contour as a uniform part of the prohibited movement range for the movable component. Advantageously, the control device may for example determine a provisional object contour based on the respective position group, compare the provisional object contour with predefined possible object contours, and determine the valid object contour based on the comparison of the provisional object contour with the predefined possible object contours.

According to another aspect of the invention, a computer program has machine code stored on a non-volatile storage medium, wherein the machine code is executed by a control device of a processing machine, with the processing machine having in a normal mode of operation a permitted movement range for movement of a movable component and a prohibited movement range for the movable component under control of a control device, with the permitted movement range and the prohibited movement range being complementary to one another and together forming a working space within which the movable component can move. The machine code causing the control device in a control mode of operation to move a pointer under guidance from a user in succession to a plurality of locations in the working space, said pointer having a plurality of first location determining devices arranged at predetermined pointer locations relative to a pointer coordinate system fixed in relation to the pointer, acquire data characteristic at least of a geometric relationship of the first location determining devices relative to a plurality of second location determining devices arranged at predetermined machine locations relative to a machine coordinate system fixed in relation to the processing machine through interaction of the first location determining devices with the second location determining devices, determine a position of the pointer in the working space based on the acquired characteristic data, the predetermined pointer locations and the predetermined machine locations, and subdivide the working space of the processing machine into the permitted movement range and the prohibited movement range based on the determined position of the pointer.

According to another aspect of the invention, a control device for a processing machine is programmed with the afore-described computer program.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
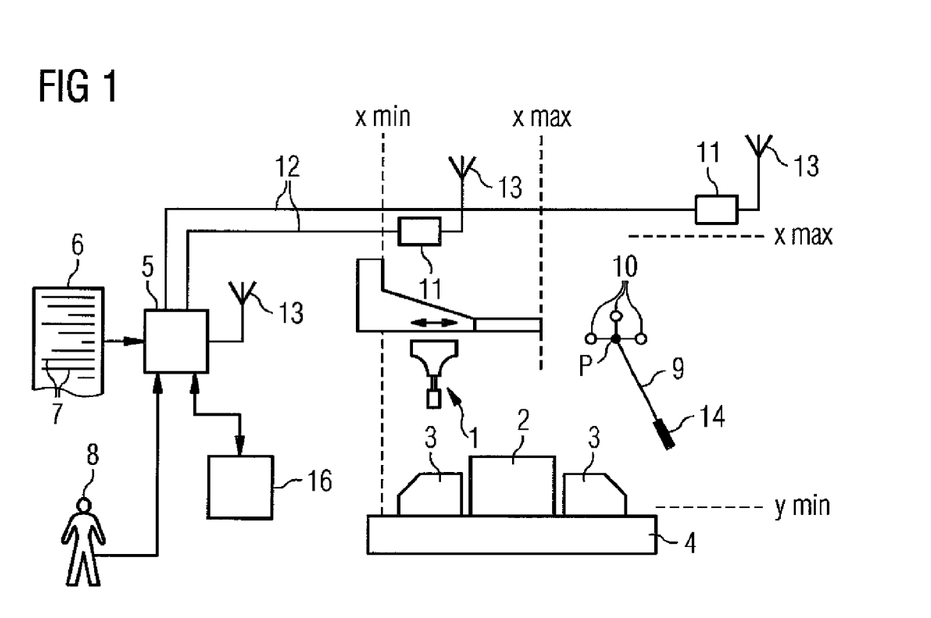
FIG. 1 shows a schematic diagram of a processing machine according to the present invention.

Turning now to the drawing, and in particular to FIG. 1, there is shown a processing machine with a movable component 1. The component 1 can be, for example, a tool by means of which a workpiece 2 is to be machined. During the machining by means of the tool 1 the workpiece 2 is clamped by means of clamping elements 3 on a workpiece holder 4. The tool 1 can be displaced, for example by means of a first drive (not shown), in a first direction—referred to hereinafter as the x-direction—between two limit positions xmin, xmax. By means of a further drive (likewise not shown) the tool 1 can be displaceable for example in a direction orthogonal to the x-direction—referred to hereinafter as the y-direction—between two further limit positions ymin, ymax. Other displacement possibilities—whether it be alternatively or whether it be in addition to the above-explained displacement options—are conceivable. For example, a further translational movement (alternatively or in addition to the above-explained translational movements) in a further direction is possible or rotational movements are possible. In certain cases coupled movements cumulatively building on one another—such as in the case of robotic arms for example—may even be possible.

Independently of the actually implemented displacement possibilities, the movable component 1 is displaceable within a predetermined working space of the processing machine, according to the example of FIG. 1, within the rectangle defined by the limit positions xmin, xmax, ymin, ymax.

The drives are controlled by a control device 5. The movable component 1 can therefore be displaced by the control device 5 within the working space of the processing machine. The control device 5 is programmed by means of a computer program 6. The computer program 6 comprises machine code 7 which can be processed directly by the control device 5. The processing of the machine code 7 by the control device 5 causes the control device 5 to execute an operating method which is explained in more detail in conjunction with FIG. 2.

Figure 2:
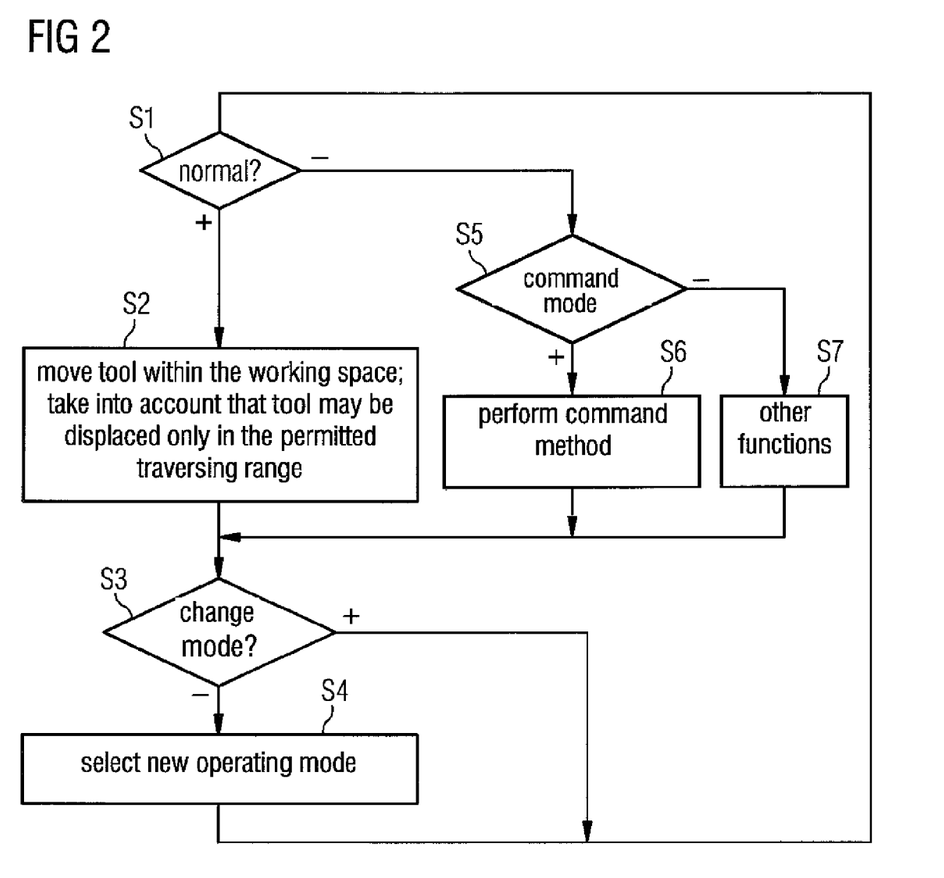
FIG. 2 shows a flowchart for determining the operating mode of a processing machine.

In a step S1, the control device 5 checks whether it is in a normal mode of operation. If this is the case, the control device performs the normal mode of operation in a step S2. In particular the machining of the workpiece 2 by means of the tool 1 takes place in the normal mode of operation. Among other functions in said mode, the tool 1 (=the movable component 1) is displaced within the working space by the control device 5. When displacing the tool 1, the control device 5 takes into account that the tool 1 may only be displaced in a subzone (=permitted movement range) of the working space. The remaining part of the working space constitutes a prohibited movement range for the movable component 1. In the course of the execution of step S2, the working space is therefore subdivided into a permitted movement range for the movable component 1 and a prohibited movement range complementary thereto.

In a step S3, the control device 5, checks whether the operating mode is to be changed. Step S3 can in particular include checking whether a corresponding input has been made by a user 8. If the operating mode is not to be changed, the control device 5 skips a step S4. Otherwise the control device 5 selects the new operating mode—for example as a result of a corresponding specification of the operating mode by the user 8—in step S4. The control device 5 thereupon returns to step S1.

If the specified operating mode in the course of the processing of step S1 is not the normal mode of operation, the control device 5 branches to a step° S5. In step S5, the control device 5 checks whether the selected operating mode is a command mode of operation. If this is the case, in a step S6 the control device 5 performs a command method which is explained in more detail below in conjunction with FIG. 3. It then resumes at step S3.

If the specified operating mode is neither the normal mode of operation nor the command mode of operation, the control device 5 branches to a step S7 in which it performs other functions.

Figure 3:
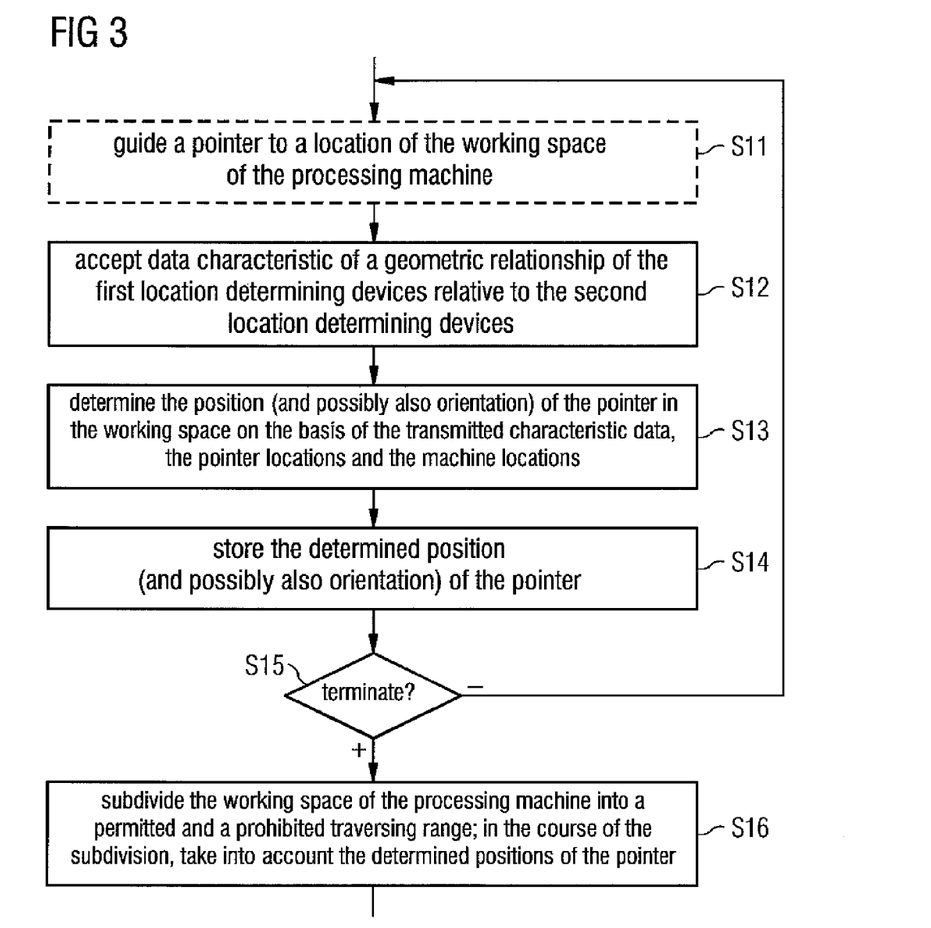
FIG. 3 shows a detail of the flowchart of FIG. 2.

FIG. 3 shows a possible embodiment of step S6 from FIG. 2.

According to FIG. 3, a pointer 9 (see FIG. 1) is guided to a location of the working space of the processing machine in a step S11. Step S11 is not performed by the control device 5, but by the user 8 of the processing machine. Step° S11 is consequently not part of the method performed by the control device 5. For this reason step S11 is depicted in FIG. 3 only by a dashed outline. Step S11 is nonetheless important for the understanding of the present invention and for this reason is included in FIG. 3.

According to FIG. 1, the pointer 9 has a number of first location determining devices 10. As a minimum, a single first location determining device 10 is present. A pointer 9 having three first location determining devices 10 is shown in FIG. 3. The first location determining devices 10 are arranged at predetermined locations relative to a pointer coordinate system referred to the pointer 9 (i.e. moved together with the pointer 9), referred to hereinafter as pointer locations. In the case of a single first location determining device 10 the location of said first location determining device 10 corresponds to the origin of the pointer coordinate system.

The first location determining devices 10 can be embodied as transmitters or as receivers. Furthermore, they can also comprise both functionalities, in other words be embodied as transmitter and as receiver (=transceiver). The first location determining devices 10 can also be embodied as (purely passive) reflectors or as transponders, i.e. a radiated signal received by them is re-emitted by them in modified form.

The first location determining devices 10 interact with second location determining devices 11. The second location determining devices 11 are complementary to the first location determining devices 10 in respect of functionality. Thus, if the first location determining devices 10 are embodied as transmitters, the second location determining devices 11 are embodied as receivers. If the first location determining devices 10 are embodied as receivers, the second location determining devices 11 are embodied as transmitters. If the first location determining devices 10 are embodied as transceivers, the second location determining devices 11 are embodied as reflectors or as transponders. If the first location determining devices 10 are embodied as reflectors or as transponders, the second location determining devices 11 are embodied as transceivers.

The second location determining devices 11 are arranged at predetermined locations, referred to hereinafter as machine locations, relative to a machine coordinate system referred to the processing machine, i.e. a stationary coordinate system in relation to the processing machine. The number of second location determining devices 11 is freely selectable within certain limits. FIG. 1 shows—purely by way of example—two second location determining devices 11. Usually at least three second location determining devices 11 are present. However, the number can be smaller in individual cases. The sum of first and second location determining devices 10, 11 usually amounts to at least five.

Through the interaction of the first and second location determining devices 10, 11 it is possible in each case to acquire data which is characteristic of a geometric relationship of the first location determining devices 10 relative to the second location determining devices 11. In particular it is possible to acquire, for each pair of first and second location determining devices 10, 11, the time instant at which a signal emitted by the corresponding transmitter is received by the corresponding receiver. In certain circumstances even the propagation delay itself can be acquired or both the transmit time and the receive time can be acquired so that the propagation delay can be determined directly by calculating the difference. In conjunction with the known propagation velocity v of the emitted signal it is therefore possible to calculate the geometric distance of the respective first location determining device 10 from the respective second location determining device 11. Provided a sufficient number of pairs of first and second location determining devices 10, 11 are present, the location of the origin of the pointer coordinate system within the working space (i.e. the position of the pointer 9) can therefore be determined.

The corresponding characteristic data is transmitted by the receivers—irrespective of whether the receivers are arranged in the first or the second location determining devices 10, 11—to the control device 5. For this purpose the receivers are connected to the control device 5 by way of a data communications link. Corresponding connecting lines 12 can be present for example. Preferably, as indicated by corresponding antennas 13 in FIG. 1, a wireless connection exists.

The control device 5 accepts the characteristic data in a step S12. In a step S13, the control device 5 determines the position P of the pointer 9 in the working space based on the transmitted characteristic data, the pointer locations and the machine locations. In the course of step S13, in addition to determining the position P of the pointer 9 in the working space, the control device 5 can in certain cases also determine its orientation. In this case usually at least three first location determining devices 10 should be present. The control device 5 stores the determined position P (and possibly also orientation) of the pointer 9 in a step S14.

The machine locations and the pointer locations must obviously be made known in a suitable manner to the control device 5 beforehand. For this, a corresponding input of the user 8 may be necessary for example. Alternatively it is possible that the corresponding details are already specified in the computer program 6.

In a step S15, the control device 5 checks whether the specification of the positions P of the pointer 9 is to be terminated. If this is not the case, a return is made to step S11, in other words the sequence of steps S11 to S14 is executed once more.

If the specification of positions P of the pointer 9 is to be terminated, the control device 5 branches to a step S16. In step S16, the control device 5 subdivides the working space of the processing machine into the permitted and the prohibited movement range. In the course of subdividing the working space the control device 5 takes into account the positions P of the pointer 9 that were determined in the course of the (in most cases repetitive) execution of steps S11 to S14. Step S16 can in particular be realized interactively in cooperation with the user 8. For example, a perspective or other representation of the working space in which the positions P are indicated can be output to the user 8 via a display and inputs from the user 8 can be accepted.

By means of the command method explained above in conjunction with FIGS. 1 to 3—in particular FIG. 3—it is therefore possible to specify movement range restrictions for the movable component 1 in a simple, efficient and intuitive way.

A possible approach to determining the position P of the pointer 9 is explained in more detail below in conjunction with FIG. 4 for the two-dimensional case by way of example for an actual embodiment. It is assumed within the framework of FIG. 4 that the first location determining device 10 is embodied as a (single) transmitter, that four second location determining devices 11 are present, and that the second location determining devices 11 record only the respective receive time. Other embodiments, for example the three-dimensional case or that the propagation delay is determined directly, that the first location determining device 10 is embodied as a pure reflector or that a plurality of first location determining devices 10 are present, can be handled in an analogous manner.

Figure 4:
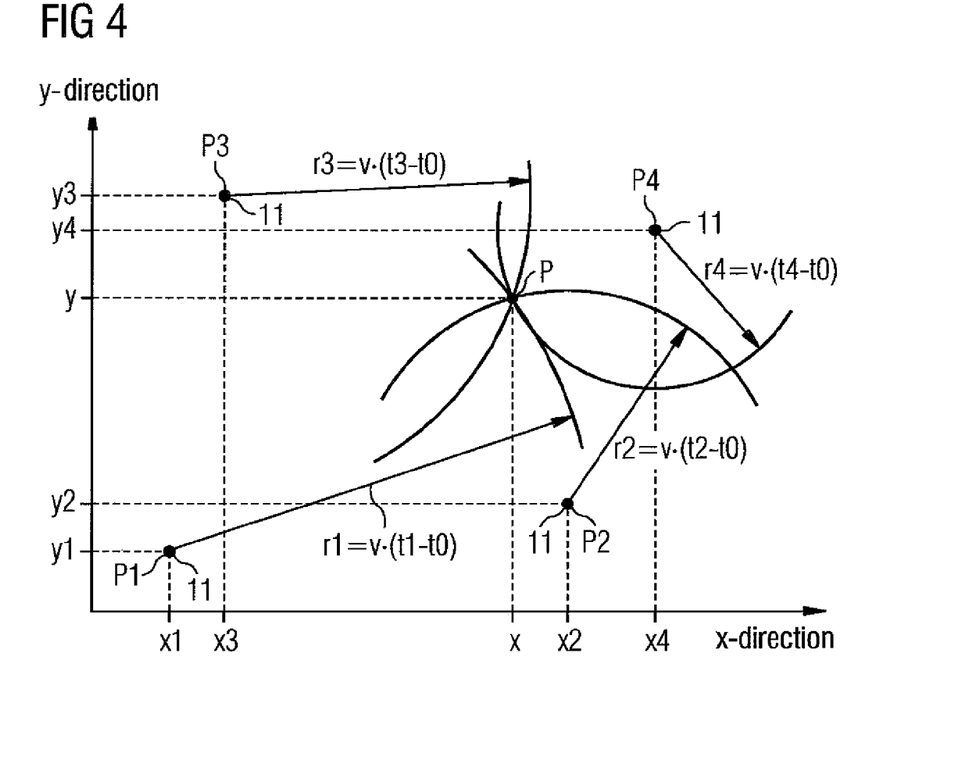
FIG. 4 shows an exemplary arrangement of first and second location determining devices.

The second location determining devices 11 are arranged at predetermined machine locations which are labeled with the reference signs P1 to P4 in FIG. 4 and have the coordinates x1, y1 to x4, y4. Owing to the fact that in the example of FIG. 4 only a single first location determining device 10 is present, the location of the first location determining device 10 can furthermore be considered as coincident with the origin of the pointer coordinate system.

Let it be further assumed that the first location determining device 10 emits a pulse-shaped transmit signal at an—in principle arbitrary—transmit time t0. The transmit signal is in this case received by the second location determining devices 11 at respective receive times t1 to t4. In that case, for distances r1 to r4 of the second location determining devices 11 from the first location determining device° 10, the following relations apply $$r1^2 = (t1-t0)^2 \cdot v^2 = (x-x1)^2 + (y-y1)^2 \quad (1)$$

$$r2^2 = (t2-t0)^2 \cdot v^2 = (x-x2)^2 + (y-y2)^2 \quad (2)$$

$$r3^2 = (t3-t0)^2 \cdot v^2 = (x-x3)^2 + (y-y3)^2 \quad (3)$$

$$r4^2 = (t4-t0)^2 \cdot v^2 = (x-x4)^2 + (y-y4)^2 \quad (4)$$

where x and y are the sought coordinates of the position P of the pointer 9.

There is accordingly an equation system available comprising four equations and three unknowns (namely the coordinates x, y and the transmit time t0). Provided the second location determining devices 11 are suitably arranged, said equation system can be solved, the solution being unambiguous. The fourth equation is necessary owing to the nonlinearity of the equation system, so that otherwise existing ambiguities can be resolved.

Figure 5:
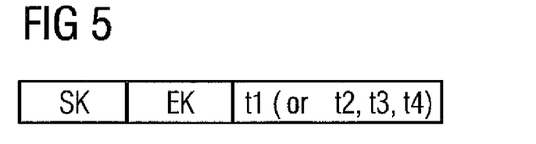
FIG. 5 shows a possible message format.

In the above-explained approach it was assumed that only the receivers (but not the transmitters) provide the signals received by them with a timestamp, i.e. that they register the respective receive time t1 to t4 and transmit the same to the control device 5. According to FIG. 5, the corresponding general data format (a plurality of transmitters—a plurality of receivers) comprises in the simplest case a transmitter identifier SK, a receiver identifier EK and the respective receive time t1 to t4 of the corresponding receiver. The transmitter identifier SK individualizes the respective transmitter, the receiver identifier the respective receiver.

Figure 6:
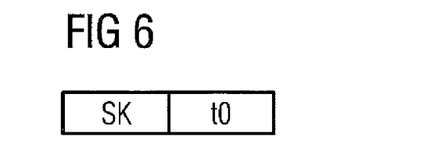
FIG. 6 shows a possible transmit signal.

So that the receiver can recognize, in the case of a plurality of transmitters, from which transmitter it receives a transmit signal, the transmit signals according to FIG. 6 can for example include the respective transmitter identifier SK.

Figure 7:
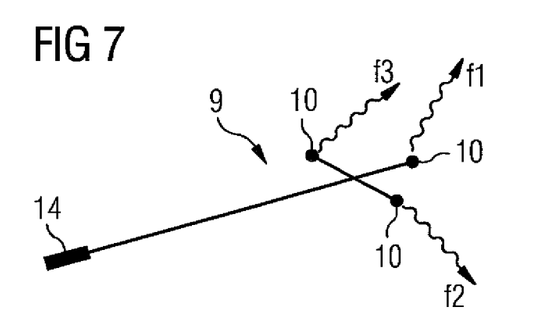
FIG. 7 shows a possible transmitter arrangement.
Figure 8:
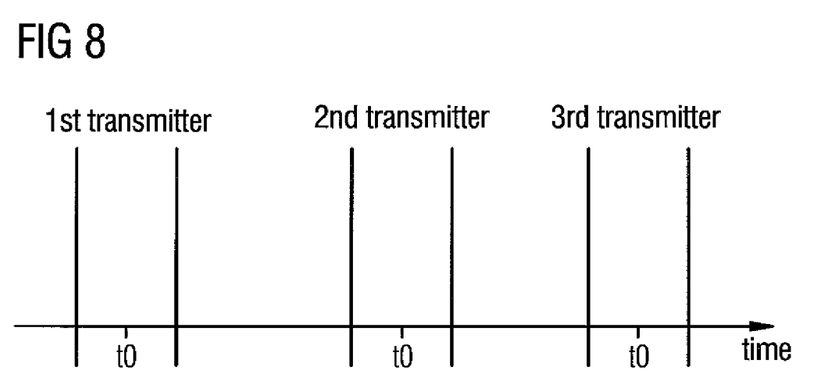
FIG. 8 shows a timing diagram.

Alternatively or in addition it is possible for the transmitters according to FIG. 7 to emit their transmit signals on different frequencies f1, f2, . . . . In this case it is recognizable based on the respective frequency f1, f2, . . . —where necessary in addition to the transmitter identifier SK—from which transmitter the corresponding transmit signal originates. Alternatively it is possible that the transmitters according to FIG. 8 are assigned predetermined transmit time zones (or even respective transmit times t0), in other words that each transmitter emits its transmit signal only at specific times. In this case, in practice, a transmit signal received from the receivers within a specific time interval can originate only from a specific transmitter.

In a preferred embodiment of the present invention—irrespective of the number of transmitters—the transmit signal emitted by the respective transmitter likewise includes a timestamp (also depicted in FIG. 6). The timestamp indicates the transmit time t0. In this case the receivers can determine the propagation delay of the respective signal directly from the difference between respective receive time t1 to t4 and respective transmit time t0.

The transmit signals emitted by the transmitters can be electromagnetic waves. Preferably, however, they are acoustic signals, in particular ultrasound signals. Because of the considerably lower propagation velocity v of sound waves compared with electromagnetic waves, the position P of the pointer 9 can in this case be determined with sufficient accuracy with considerably less effort (in particular the overhead involved in synchronizing the transmitters and/or receivers with one another).

The pointer 9 cannot be moved by the user 8 arbitrarily quickly from position P to position P. The user 8 must therefore make known in a suitable manner when the pointer 9 has reached the next position P that is to be acquired.

It is possible that the characteristic data is acquired continuously and that the pointer 9 is assumed to have reached the next position P that is to be acquired when it is not moved for a sufficiently long period of time (for example more than two or three seconds). Preferably, however, a proactive confirmation is given by the user 8. According to the illustration of FIG. 9, for example, the pointer 9 can have a handle section 14. A trigger element 15 which can be actuated by the user 8 can be arranged in the handle section 14. The trigger element 15 can be embodied for example as a corresponding button.

Figure 9:
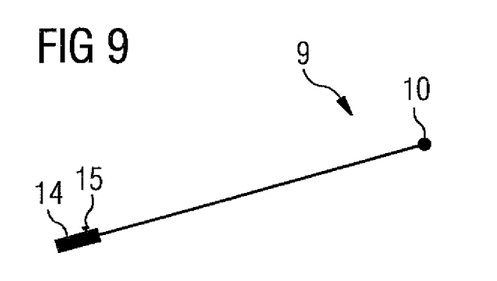
FIG. 9 shows a pointer.

Actuating the trigger element 15 has the effect that—at least as the end result—the determination of the position P of the pointer 9 is initiated. For example, the actuation of the trigger element 15 can be communicated to the transmitters and/or the receivers and initiate their operation. In the case of the embodiment of the first or second location determining devices 10, 11 as transponders, the actuation of the trigger element 15 can for example trigger the activation of the transponders. In all these cases the actuation of the trigger element 15 initiates the acquisition of the characteristic data.

Alternatively or in addition, the actuation of the trigger element 15 can be communicated to the receivers and there initiate the transmission of the acquired characteristic data to the control device 5. Alternatively or in addition, the actuation of the trigger element 15 can be communicated to the control device 5 and there initiate the determination of the position P of the pointer 9, in other words, as it were, to validate the characteristic data transmitted—possibly continuously—to the control device 5.

The subdivision of the working space into the permitted and the prohibited movement range—in other words step S16 of FIG. 3—can be implemented in different ways. For example, the movement range of an individual axis can be limited by means of an individual specified position P. Equally it is possible to derive from a plurality of points a plane which represents an areal limitation of the working space. It is furthermore possible to select a number of positions which can be regarded as corner points of a two- or three-dimensional object which represents a problematic geometry which must be circumnavigated. Some of these possibilities are explained in more detail below.

Figure 10:
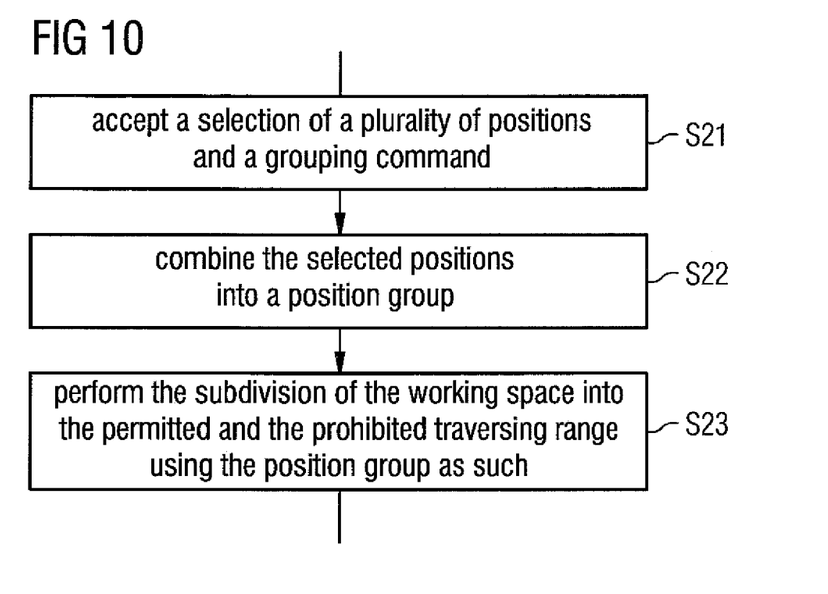
FIG. 10 shows a flowchart with a first process for subdividing the workspace.

In a step S21 according to FIG. 10, for example, the user 8 can select a plurality of the previously determined positions P of the pointer 9 and specify a grouping command to the control device 5. If this is the case, in a step S22 the control device 5 combines the selected positions P into a position group. In a step° S23, the control device 5 subdivides the working space into the permitted and the prohibited movement range using the position group as such.

In step S21, for example, the user 8 can select three positions P initially and then a further position P of the pointer 9. The three first-cited positions P define a plane which separates the permitted from the prohibited movement range. The fourth position P should lie outside of the plane defined by the three first-cited positions P, i.e. either in the permitted movement range or in the prohibited movement range. In this case the user 8 now only needs to specify to the control device 5 whether the further position P lies in the permitted or in the prohibited movement range.

Figure 11:
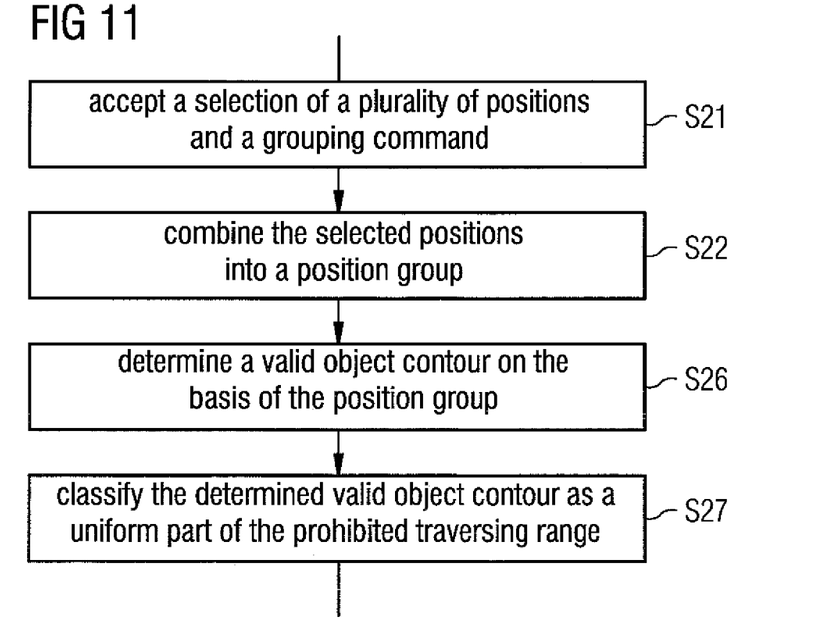
FIG. 11 shows a flowchart with a second process for subdividing the workspace.

Alternatively or in addition it is possible to replace step S23 according to FIG. 11 with steps S26 and S27. In step S26, the control device 5 determines a valid object contour based on the position group. In step S27, the control device 5 classifies the determined valid object contour as a uniform part of the prohibited movement range. The grouping command of step S21 is in this case obviously a different command than when a plane is to separate the permitted from the prohibited movement range.

Various possibilities are available for determining the valid object contour. For example, the control device 5 can determine two- or three-dimensionally a polyhedron (polygon) which contains all the positions P of the corresponding position group. Said polyhedron/polygon can be considered a valid object structure.

Figure 12:
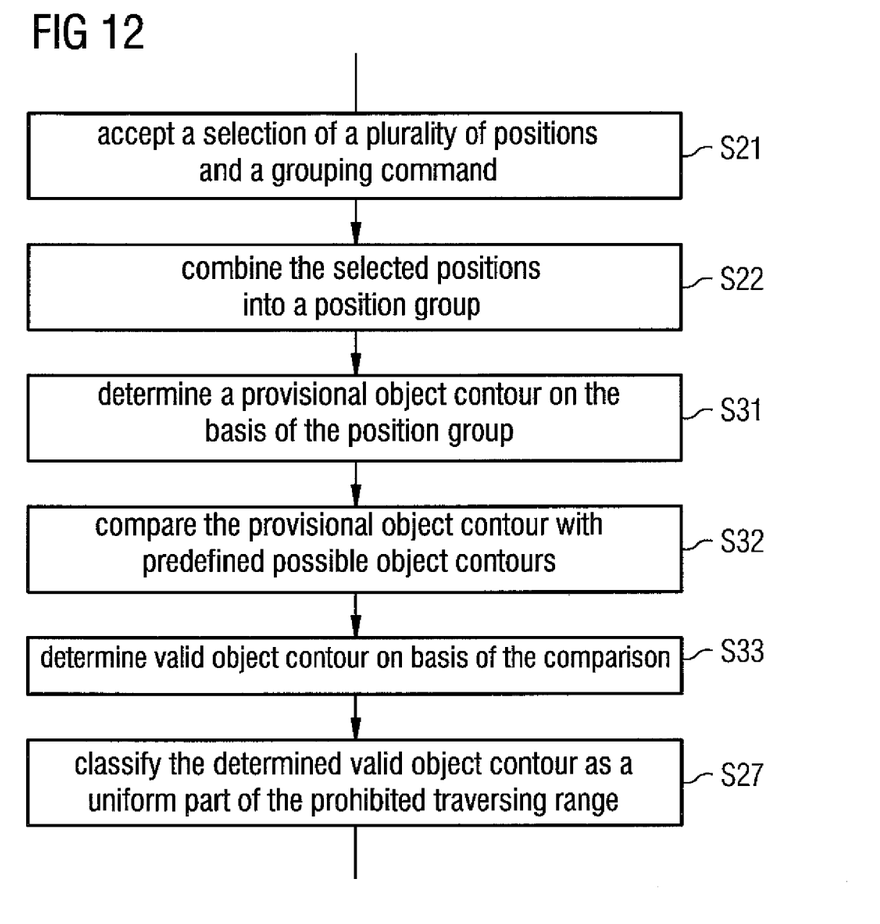
FIG. 12 shows a flowchart with a third process for subdividing the workspace.

Alternatively, according to FIG. 12, step S26 can be replaced by steps S31 to S33. In step S31, the control device 5 determines—in an analogous manner to step S26 of FIG. 11—an object contour. However, said object contour does not yet correspond to the valid object contour, but only to a provisional object contour. In step S32, the control device 5 compares the provisional object contour of step S31 with predefined possible object contours. The possible object contours can be stored for example in a database 16 to which the control device 5 has access. In the course of step S32 the control device 5 can for example determine degrees of similarity between the provisional object contour and the possible object contours. In step S33, the control device 5 determines the valid object contour based on the comparison of step S32. For example, one of the predefined possible object contours can be determined as the valid object contour in step S33. Where appropriate, this determination can be carried out only when a minimum degree of similarity for said possible object contour is exceeded. Otherwise the provisional object contour can be adopted as the valid object contour.

The present invention has many advantages. In particular it is possible in a simple and intuitive manner for the user 8 to subdivide the working space that is possible in principle into a permitted and a prohibited movement range. The command method according to the invention operates reliably and robustly, and is rapidly deployable. Process stability is increased considerably in practice. The handling of the pointer 9 is compatible with human gestures. It replaces the time-consuming and laborious numerical inputting of columns of numbers. The subdivision can be conveniently validated by the user 8 by means of a graphics-based representation of the traversing space defined by the positions P.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for operating a processing machine, the processing machine having in a normal mode of operation a permitted movement range for movement of a movable component and a prohibited movement range for the movable component under control of a control device, with the permitted movement range and the prohibited movement range being complementary to one another and together forming a working space within which the movable component can move, the method comprising:
   moving a pointer under guidance from a user in succession to a plurality of locations in the working space, said pointer having a plurality of first location determining devices arranged at predetermined pointer locations relative to a pointer coordinate system fixed in relation to the pointer,
   acquiring with the control device data characteristic at least of a geometric relationship of the first location determining devices relative to a plurality of second location determining devices arranged at predetermined machine locations relative to a machine coordinate system fixed in relation to the processing machine through interaction of the first location determining devices with the second location determining devices,
   determining with the control device a position of the pointer in the working space based on the acquired characteristic data, the predetermined pointer locations and the predetermined machine locations, and
   subdividing with the control device the working space of the processing machine into the permitted movement range and the prohibited movement range based on the determined position of the pointer.

2. The method of claim 1, wherein the characteristic data are representative of distances between the first location determining devices and the second location determining devices.

3. The method of claim 1, wherein the first location determining devices or the second location determining devices emit a signal, wherein the corresponding second location determining devices or the corresponding first location determining devices receive the emitted signal, and wherein the corresponding second or first location determining devices that receive the signal transmit the characteristic data to the control device.

4. The method of claim 3, wherein at least the location determining devices receiving the signal add a timestamp to the signal.

5. The operating method of claim 3, wherein a plurality of location determining devices transmit a corresponding signal which includes a specific transmitter identifier.

6. The operating method of claim 3, wherein a plurality of location determining devices transmit a corresponding signal, with the corresponding signals being emitted simultaneously on different frequencies or by using time division multiplexing.

7. The method of claim 3, wherein the characteristic data are transmitted wirelessly from the location determining devices receiving the emitted signal to the control device.

8. The method of claim 3, wherein the signals emitted by the first location determining devices or the second location determining devices are acoustic signals.

9. The method of claim 8, wherein the acoustic signals are ultrasound signals.

10. The method of claim 1, wherein the first location determining devices or the second location determining devices emit a signal, wherein the corresponding second location determining devices or the corresponding first location determining devices receive the emitted signal, and wherein the corresponding second or first location determining devices that receive the signal reflect the emitted signals or re-emit the emitted signals in modified form, and transmit the characteristic data to the control device.

11. The method of claim 1, wherein in addition to determining the position of the pointer in the working space, the method further comprises determining an orientation of the pointer in the working space based on the transmitted characteristic data, the predetermined pointer locations and the predetermined machine locations.

12. The method of claim 1, further comprising actuating by the user a trigger element disposed in a handle section of the pointer which initiates at least one of acquisition of the characteristic data and transmission of the characteristic data to the control device and determination of the position of the pointer in the working space.

13. The method of claim 1, further comprising:
selecting determined positions of the pointer by the user, specifying a grouping command,
combining the selected positions of the pointer into position groups based on the grouping command, and
subdividing the working space into the permitted and the prohibited movement range based on the position groups.

14. The method of claim 13, further comprising:
determining a valid object contour based on a respective position group, and
classifying the determined valid object contour as an integral part of the prohibited movement range for the movable component.

15. The method of claim 14, further comprising:
determining a provisional object contour based on a respective position group,
comparing the provisional object contour with predefined possible object contours, and
determining the valid object contour by comparing the provisional object contour with the predefined possible object contours.

16. A computer program comprising machine code stored on a non-volatile storage medium, wherein the machine code is executed by a control device of a processing machine, the processing machine having in a normal mode of operation a permitted movement range for movement of a movable component and a prohibited movement range for the movable component under control of a control device, with the permitted movement range and the prohibited movement range being complementary to one another and together forming a working space within which the movable component can move, said machine code causing the control device in a control mode of operation to
move a pointer under guidance from a user in succession to a plurality of locations in the working space, said pointer having a plurality of first location determining devices arranged at predetermined pointer locations relative to a pointer coordinate system fixed in relation to the pointer,
acquire data characteristic at least of a geometric relationship of the first location determining devices relative to a plurality of second location determining devices arranged at predetermined machine locations relative to a machine coordinate system fixed in relation to the processing machine through interaction of the first location determining devices with the second location determining devices,
determine a position of the pointer in the working space based on the acquired characteristic data, the predetermined pointer locations and the predetermined machine locations, and
subdivide the working space of the processing machine into the permitted movement range and the prohibited movement range based on the determined position of the pointer.

17. A control device for a processing machine, wherein the control device is programmed with the computer program of claim 16.

* * * * *